(12) United States Patent
Achtnig et al.

(10) Patent No.: US 8,515,568 B1
(45) Date of Patent: *Aug. 20, 2013

(54) APPARATUS AND METHODS FOR MONITORING HEALTH OF SEMICONDUCTOR PROCESS SYSTEMS

(75) Inventors: Jeffery William Achtnig, Calgary (CA); Russell Fleming, Pleasanton, CA (US); Jaideep Jain, San Jose, CA (US)

(73) Assignee: Novellus Systems, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/242,816

(22) Filed: Sep. 23, 2011

Related U.S. Application Data

(63) Continuation of application No. 11/473,890, filed on Jun. 23, 2006, now Pat. No. 8,055,370.

(51) Int. Cl.
| | |
|---|---|
| *G05B 15/02* | (2006.01) |
| *G05B 11/01* | (2006.01) |
| *G05B 13/02* | (2006.01) |
| *G06F 11/30* | (2006.01) |
| *G06F 17/18* | (2006.01) |
| *G06F 19/00* | (2006.01) |
| *G01N 37/00* | (2006.01) |

(52) U.S. Cl.
USPC ............ 700/108; 700/9; 700/19; 700/32; 700/109; 700/110; 700/121; 702/84; 702/181; 702/182; 702/183

(58) Field of Classification Search
USPC ............ 700/9, 19, 29, 32, 108, 109, 110, 700/121; 257/E21.525; 702/84, 178, 181, 702/182, 183
See application file for complete search history.

(56) References Cited

U.S. PATENT DOCUMENTS

| | | | |
|---|---|---|---|
| 5,347,460 | A | 9/1994 | Gifford et al. |
| 5,654,903 | A | 8/1997 | Reitman et al. |
| 5,696,689 | A | 12/1997 | Okumura et al. |
| 5,862,054 | A | 1/1999 | Li |
| 5,923,553 | A | 7/1999 | Yi |
| 5,940,300 | A | 8/1999 | Ozaki |

(Continued)

OTHER PUBLICATIONS

U.S. Appl. No. 11/473,890, Office Action mailed Oct. 30, 2008.

(Continued)

*Primary Examiner* — Mohammad Ali
*Assistant Examiner* — Jennifer L Norton
(74) *Attorney, Agent, or Firm* — Weaver Austin Villeneuve & Sampson LLP

(57) ABSTRACT

Disclosed are apparatus and methods for monitoring an operation parameter of a process tool, independently of a process system recipe, are provided. In one embodiment, the behavior of a process device as it transitions between different states is monitored for a single cycle of operation or over time to detect trends that indicate a potential failure of the process device. When a trend that indicates a potential failure is detected, an alarm is generated. In one implementation, the time for reaching a particular stage of operation may be repeatedly monitored over a plurality of device cycles. For example, the time to open a valve or door may be monitored. In another example, the time for reaching a stable phase of gas flow after a ramping stage has commenced is monitored. When the time for reaching a particular stage begins to decline by a predetermined amount, an alarm may be generated.

23 Claims, 8 Drawing Sheets

(56) References Cited

U.S. PATENT DOCUMENTS

| | | | |
|---|---|---|---|
| 6,202,000 | B1 | 3/2001 | Rheem |
| 6,246,325 | B1 | 6/2001 | Chittipeddi |
| 6,308,122 | B1 | 10/2001 | Nishizaki et al. |
| 6,408,220 | B1 | 6/2002 | Nulman |
| 6,556,884 | B1 | 4/2003 | Miller et al. |
| 6,563,300 | B1 | 5/2003 | Jackson et al. |
| 6,567,718 | B1 | 5/2003 | Campbell et al. |
| 6,671,570 | B2 | 12/2003 | Schulze |
| 6,684,124 | B2 | 1/2004 | Schedel et al. |
| 6,785,586 | B1 | 8/2004 | Toprac et al. |
| 6,907,306 | B2 | 6/2005 | Hsieh et al. |
| 6,947,803 | B1 * | 9/2005 | Bode et al. .................... 700/121 |
| 7,113,838 | B2 * | 9/2006 | Funk et al. .................... 700/108 |
| 7,257,457 | B2 * | 8/2007 | Imai et al. .................... 700/121 |
| 7,289,860 | B1 | 10/2007 | Tanzer |
| 7,304,001 | B2 | 12/2007 | Miyazaki et al. |
| 7,477,960 | B2 | 1/2009 | Willis et al. |
| 7,505,879 | B2 | 3/2009 | Tomoyasu et al. |
| 8,055,370 | B1 | 11/2011 | Achtnig et al. |
| 8,280,530 | B2 * | 10/2012 | Kase .................... 700/21 |
| 2001/0027350 | A1 | 10/2001 | Koga et al. |
| 2001/0039462 | A1 * | 11/2001 | Mendez et al. ............ 700/45 |
| 2002/0022969 | A1 | 2/2002 | Berg et al. |
| 2002/0042694 | A1 | 4/2002 | Henry et al. |
| 2004/0091135 | A1 | 5/2004 | Bourg et al. |
| 2004/0193291 | A1 | 9/2004 | Sakai |
| 2004/0243268 | A1 | 12/2004 | Hsieh et al. |
| 2004/0267399 | A1 | 12/2004 | Funk |
| 2005/0143952 | A1 | 6/2005 | Tomoyasu et al. |
| 2005/0171626 | A1 * | 8/2005 | Schwarm .................... 700/108 |
| 2005/0171627 | A1 | 8/2005 | Funk et al. |
| 2005/0192698 | A1 | 9/2005 | Cheng et al. |
| 2006/0048010 | A1 | 3/2006 | Tai et al. |
| 2007/0156274 | A1 | 7/2007 | Dierks et al. |
| 2008/0082197 | A1 | 4/2008 | Lacaille |
| 2009/0243393 | A1 | 10/2009 | Miyahara et al. |
| 2009/0288050 | A1 | 11/2009 | Celik et al. |

OTHER PUBLICATIONS

U.S. Appl. No. 11/473,890, Office Action mailed Feb. 25, 2009.
U.S. Appl. No. 11/473,890, Office Action mailed Jun. 9, 2009.
U.S. Appl. No. 11/473,890, Office Action mailed Dec. 11, 2009.
U.S. Appl. No. 11/473,890, Office Action mailed Mar. 31, 2010.
U.S. Appl. No. 11/473,890, Office Action mailed Sep. 10, 2010.
U.S. Appl. No. 11/473,890, Notice of Allowance mailed Jul. 6, 2011.

* cited by examiner

APPARATUS AND METHODS FOR MONITORING HEALTH OF SEMICONDUCTOR PROCESS SYSTEMS

CROSS REFERENCE TO RELATED PATENT APPLICATION

This application is a continuation of and claims priority of U.S. patent application Ser. No. 11/473,890, entitled APPARATUS AND METHODS FOR MONITORING HEALTH OF SEMICONDUCTOR PROCESS SYSTEMS, filed 23 Jun. 2006 by Jeffery William Achtnig et al., which application is incorporated herein by reference in its entirety for all purposes.

BACKGROUND OF THE INVENTION

The present invention relates generally to processing of semiconductor wafers in a plurality of processing systems. More specifically, it relates to automatically monitoring the operation of such processing systems.

Generally, the industry of semiconductor manufacturing involves highly complex techniques for fabricating integrating circuits from semiconductor materials that are layered and patterned onto a substrate, such as silicon, by various process systems. For example, a first process system deposits a layer of material, while another process system etches a pattern in such deposited material.

Each process system includes an interface for inputting a recipe for controlling the process. The recipe generally includes a plurality of setpoints that each specifies an operating parameter value for a particular device of the process system. For example, a setpoint for a chemical vapor deposition (CVD) system may specify a gas flow value for a particular flow control component in the CVD system. Other types of devices may include valves, lifts, pedestals, indexers, robots for wafer handling, etc. These devices are given a particular command for performing an action so as to reach a specified setpoint, and the device then automatically performs such action.

It is often desirable to monitor an operating parameter of a process device to determine whether it has reached a specified setpoint. The problem with providing such a monitoring scheme is that the particulars of a recipe, such as setpoint, are often proprietary. That is, a user of a process system may set up the process system with a proprietary recipe and then not wish the recipe setpoints to be output from the process system, for example, for monitoring purposes by a third party, such as the process system support personnel.

Accordingly, it would be beneficial to provide a mechanism for monitoring the operation of a process system without requiring knowledge of the recipe setpoints or any other proprietary information.

SUMMARY OF THE INVENTION

Apparatus and methods for monitoring an operation parameter of a process tool, independently of a process system recipe, are provided. In general, an indirect effect that results from implementing an event from a process system recipe on the process system is monitored without using the specific values or setpoints that are entered for such event into the process system to thereby change a state of such process system. In one embodiment, the behavior of a process device as it transitions between different states is monitored for a single cycle of operation or over time to detect trends that indicate a potential failure of the process device. When a trend that indicates a potential failure is detected, an alarm is generated. In one implementation, the time for reaching a particular stage of operation may be repeatedly monitored over a plurality of device cycles. For example, the time to open a valve or door may be monitored. In another example, the time for reaching a stable phase of gas flow after a ramping stage has commenced is monitored. When the time for reaching a particular stage begins to decline by a predetermined amount, an alarm may be generated.

In one embodiment, a method of monitoring a process system for performing a fabrication operation on a semiconductor wafer is disclosed. Feedback specifying a characteristic of a component of the process system is received. The characteristic is in response to input data sent to the component. It is determined whether there is an actual or imminent problem with the process system based the feedback from such component. Such determination is accomplished without analysis of the input data sent to such component. The actual or imminent problem is reported or an alert is sent regarding the actual or imminent problem when it is determined that there is an actual or imminent problem.

In a specific implementation, the component is a valve of the process system, the feedback specifies the state of the valve, and it is determined that there is an actual or imminent problem when the valve has a delay for transitioning between an open and closed state and such delay is greater than a predetermined duration or such delay has a rate of change over time that is greater than a predetermined amount. In another implementation, the component is a door of the process system, the feedback specifies the state of the door, and it is determined that there is an actual or imminent problem when the door has a delay for transitioning between an open and closed state that is greater than a predetermined duration or such delay has a rate of change over time that is greater than a predetermined amount. In yet another implementation example, the component is a mass flow controller (MFC) or a unit pressure controller (UPC) of the process system, the feedback specifies the state of the MFC or UPC, and it is determined that there is an actual or imminent problem when the MFC or UPC has a delay for transitioning between an idle and stable state and such delay is greater than a predetermined duration or such delay has a rate of change over time that is greater than a predetermined amount. In another aspect, the feedback specifies an effective orifice diameter of the MFC or UPC, and it is determined that there is an actual or imminent problem when the effective orifice diameter correlates with probability of failure that is higher than a predetermined amount.

In another feature, the component is a pedestal or a lift of the process system, the feedback specifies the state of the position of the pedestal or lift, and it is determined that there is an actual or imminent problem when the pedestal or lift has a delay for transitioning between an up and down state and such delay is greater than a predetermined duration or such delay has a rate of change over time that is greater than a predetermined amount. In another implementation, the component is a wafer indexer of the process system, the feedback specifies the state of the position of the indexer, and it is determined that there is an actual or imminent problem when the indexer has a delay for transitioning between a first and a second position and such delay is greater than a predetermined duration or a rate of change of such delay over time is greater than a predetermined amount. In another embodiment, the component is a robot arm of the process system, the feedback specifies the state of the position of the robot arm, and it is determined that there is an actual or imminent problem when the robot arm has a delay for transitioning between a first and a second position and such delay is greater than a predetermined duration or a rate of change of such delay over time is greater than a predetermined amount. In another aspect, the component is a radio frequency (RF) generator of the process system, the feedback specifies the state of the RF generator, and it is determined that there is an actual or imminent problem when the RF generator has a delay for transitioning between an on and off state and such delay is greater than a predetermined duration or a rate of change of such delay over time is greater than a predetermined amount.

In a further aspect, an alert regarding the actual or imminent problem is sent when it is determined that there is an actual or imminent problem, and a shutdown of the process system is scheduled. Wafers are re-routed to another process system. The process system is then examined to determine a cause of the problem. In another aspect, determining whether there is an actual or imminent problem with the process system is accomplished by correlating the feedback with feedback from other measurement devices to thereby predict failure are likely to occur under a set of conditions of the current and other measurement devices.

In another embodiment, the invention pertains to an apparatus for monitoring a process system for performing a fabrication operation on a semiconductor wafer. The apparatus includes one or more processors and one or more memory. At least one of the processors and memory are adapted for performing one or more of the above described method operations. In another embodiment, the invention pertains to a computer program product for monitoring a process system for performing a fabrication operation on a semiconductor wafer. The computer program product includes at least one computer readable medium and computer program instructions stored within the at least one computer readable product configured to cause a processing device to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

The present invention is illustrated by way of example, and not by way of limitation.

DETAILED DESCRIPTION OF THE INVENTION

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
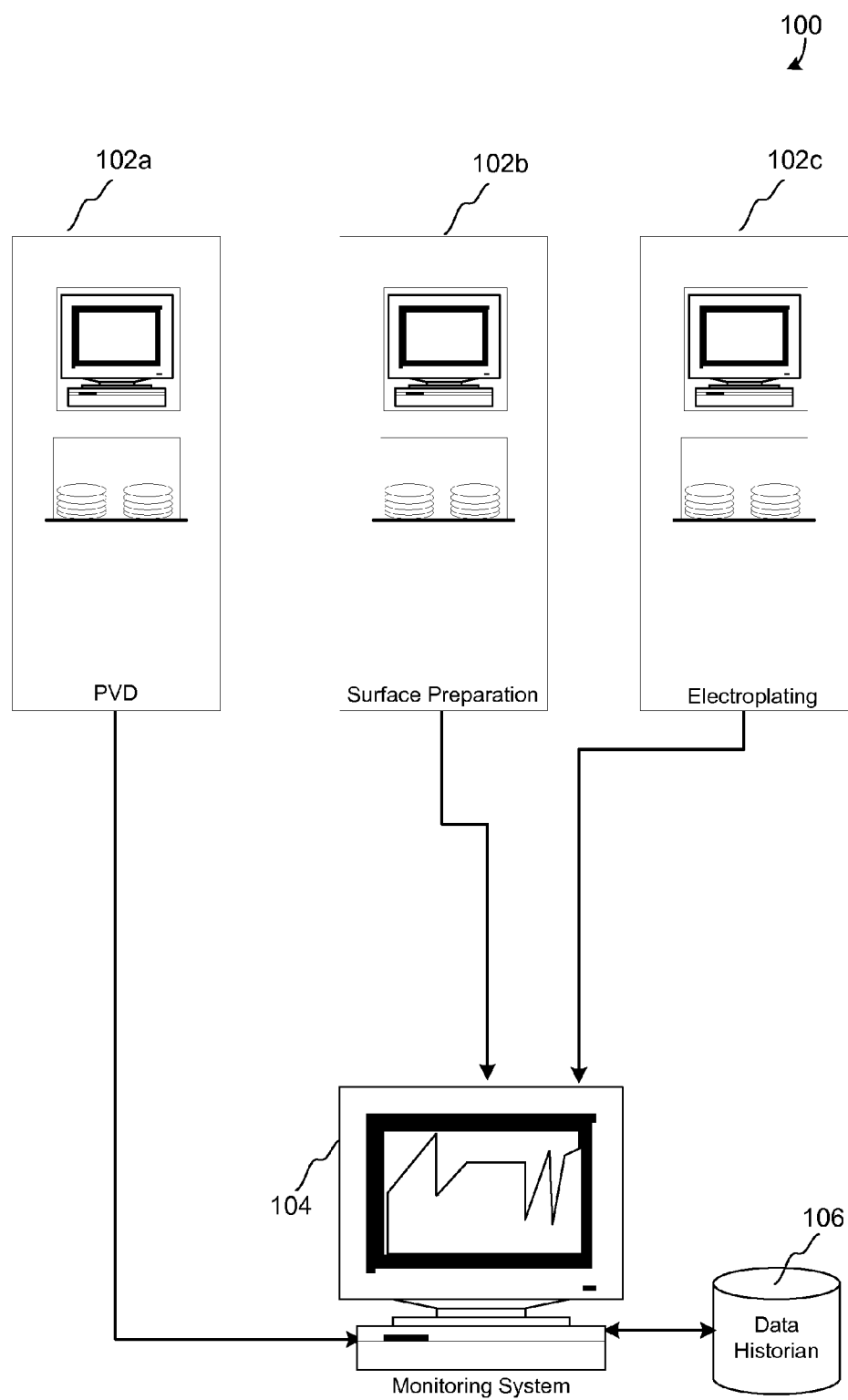
FIG. 1 is a diagrammatic representation of a fabrication facility in accordance with one embodiment of the present invention.

In this application, the term "wafer" is used extensively and refers to a semiconductor wafer at any stage in the fabrication process. The discussion herein focuses on monitoring the health of process systems which perform various stages of the fabrication process. Examples of process systems include chemical vapor deposition (CVD) tools such as plasma-enhanced chemical vapor deposition (PECVD) tools or high-density plasma chemical vapor deposition process (HDP CVD) tools, physical vapor deposition (PVD) tools, ALD (atomic layer deposition) tools, electrochemical deposition (ECD) or electroplating tools, surface preparation tools, chemical mechanical (CMP) tools, ultra violet thermal processing (UVTP) tools, and etching tools. The invention is not limited to the specific types of process systems discussed herein however. FIG. 1 is a diagrammatic representation of a fabrication facility 100 in accordance with one embodiment of the present invention. As shown, the facility 100 includes a plurality of process systems 102 for performing a particular fabrication process on a semiconductor wafer, or the like. Although only three different process systems 102 are illustrated, of course, the facility would typically have different process systems numbering in the tens or hundreds. In FIG. 1, the facility 100 includes a PVD tool 102a for depositing a film, a surface preparation tool 102b for stripping photoresist from a wafer or post-process cleaning of a wafer, and an electroplating tool 102c for building copper primary conduction wires in an integrated circuit.

In the present invention, the facility 100 also includes a monitoring system 104 having one or more databases, referred to as a data historian 106, for tracking the health of one or more process systems and reporting problems or potential problems with such process systems. The monitoring system 104 may take the form of a stand alone system (as shown) or be integrated in one or more process tools. A problem or potential problem may include any aberration which causes (or may cause) damage to a person, product, and/or the process system.

Figure 2:
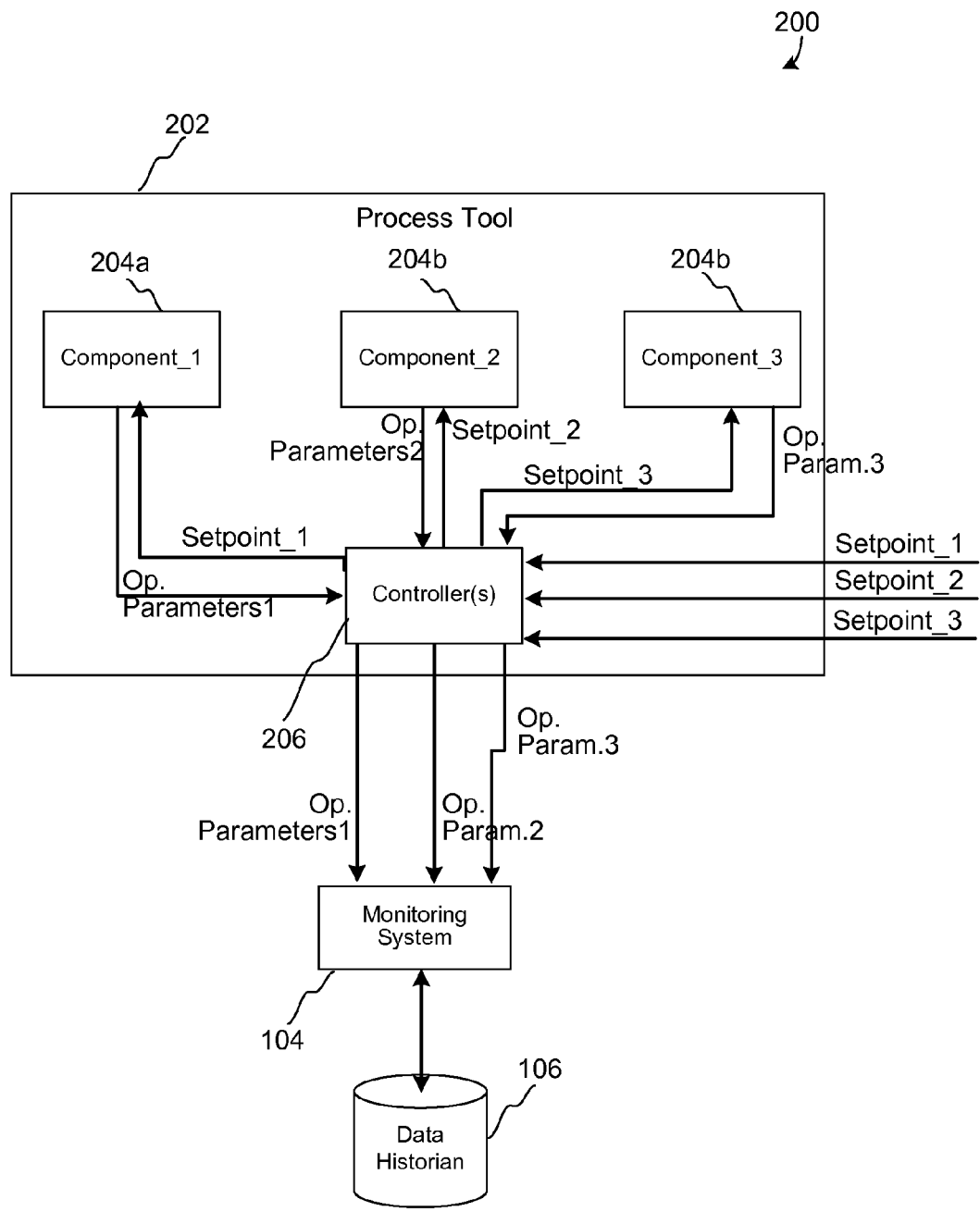
FIG. 2 is block diagram illustrating how the monitoring system of FIG. 1 can be coupled with various components of a particular process tool in accordance with a specific implementation of the present invention.

FIG. 2 is a block diagram illustrating how the monitoring system 104 of FIG. 1 can be coupled with various components 204 of a particular process tool 202 in accordance with a specific implementation of the present invention. As shown, monitoring system 104 is coupled with these components 204 through one or more controller(s) 206. Examples of components include, but are not limited to, mass flow controllers (MFC's), unit pressure controllers (UPC's), temperature controllers, valves, pedestals, lifts, generators, indexers, robots, etc.

The controller(s) may be arranged in any suitable configuration. In one implementation, controllers are arranged hierarchically (not shown). For instance, a first level of I/O controllers each control and is coupled directly to a specific subset of components; a second level of module controllers control are each coupled to one or more I/O controllers; and a top level system controller controls and is coupled directly to all of the module controllers.

No matter the particular arrangement of controllers, the controllers are generally configured to send commands to control behavior of the components. For example, commands may be sent to close or open a valve or door, raise or lower a pedestal or a lift to an up or down position, cause the pressure or flow rate of a gas to change to a particular setpoint, cause a robot or indexer to move to a particular position, activate or deactivate an RF (radio frequency) generator to generate or dissipate a plasma, cause a temperature controller to move to a particular temperature, change a lamp intensity, cause a chamber to be pumped to a vacuum state, initiate a plasma to be generated, initiate a flow (e.g., gas or liquid), set a particular current or voltage, set a rotational speed, set a particular pressure, etc. In general, a particular setpoint is specified to a particular component at a particular time so as to cause the component to change its state to such setpoint. A setpoint generally specifies a specific operation such setting the component to one or more particular parameter values and/or a duration of time for such setting. As shown, Setpoint_1 is input to component 204a; Setpoint_2 is input to component 204b; and Setpoint_3 is input to component 204c.

While a component is attempting to reach such setpoint, various operating parameters may be measured and output from the component to the monitoring system 104. For example, Operating Parameter1 is output from component 204a in response to Setpoint_1; Operating Parameter2 is output from component 204b in response to Setpoint_2; Operating Parameter3 is output from component 204c in response to Setpoint_3. One or more operating parameters may be output from a particular component during various stages of the system. The operating parameters may include one or more measured values, indicate the time of a particular event or measurement, and/or specify the particular operational state or phase. A measured value may include pressure, flow rate, temperature, effective orifice diameter, RF or DC power level, a time duration to process the wafer, a rotation speed, a voltage or current value, purge time, pump time, heat time, etc. The following state transitions may be indicated: up, down, open, closed, wafer index, robot arm position, a gas stable or idle state, etc. The operating parameters would also typically include identifiers for the particular component and processing system.

In one implementation, the operating parameters are input to the monitoring system in an event driven manner. That is, operating parameters are output when a significant event in the component occurs. For example, an event occurs when the measurement device transitions to a new state. The controllers may be operable to detect a new state by analyzing the measured output's curve shape. For instance, a significant change in a measured value has occurred after it has leveled off or when ramping has commenced. Alternatively, the monitoring system may periodically poll each component for operating parameters or each component may continuously and periodically output operating parameters without being event driven.

In embodiments of the present invention, the operating parameters that are measured and output from a particular component do not have to include the specified setpoints that were input to the particular component. In other words, the monitoring tool does not require knowledge of the recipe that is used to control the particular components of a particular process system. In a specific embodiment, output of the Setpoint (e.g., from a controller or component) to the monitoring system is disabled.

Figure 3A:
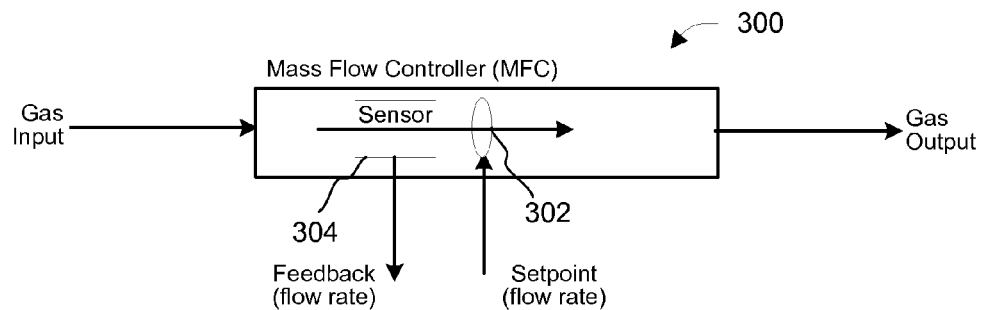
FIG. 3A is a diagrammatic representation of a mass flow controller.

FIG. 3A is a diagrammatic representation of an MFC 300 that will be used to describe the basic operation of such component. In general, gas is input to MFC 300, flows through a sensor 304 and orifice 302, and output from the MFC. The gas flow rate may be controlled by inputting a setpoint specifying a particular flow rate, e.g., standard liters per minute (slm) or standard cubic centimeters per minute (sccm), to the MFC. The setpoint causes the flow rate to change to thereby reach such setpoint. For instance, the setpoint input causes the orifice 302 to open to a wider size or close to a narrower size. The sensor detects the gas flow rate. The MFC also outputs feedback, for example, in the form of a flow rate value. This flow rate may eventually be included in a set of operating parameters, along with a time and state value, to a monitoring system (e.g., 104). The effective orifice diameter may also be output from the MFC 300 to the monitoring system.

Figure 3B:
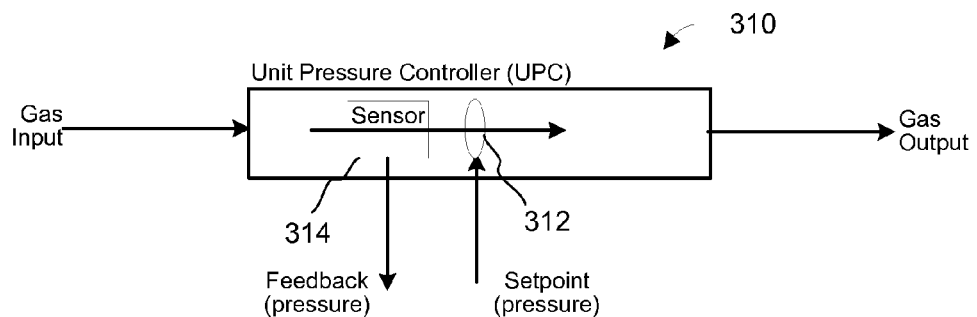
FIG. 3B is a diagrammatic representation of a unit pressure controller.

FIG. 3B is a diagrammatic representation of an UPC 310. Similar to an MFC, gas is input to UPC 310, flows through a sensor 314 and orifice 312, and output from the UPC. The gas flow rate may be controlled by inputting a setpoint specifying a particular pressure value, e.g., pounds per square inch (psi), to the UPC. The setpoint causes the pressure to change by opening or closing the orifice, for example, to thereby reach such setpoint. The UPC also outputs feedback, for example, in the form of a pressure value and perhaps effective orifice diameter. This pressure value (and effective orifice diameter) may also eventually be included in a set of operating parameters, along with a time and state value, to a monitoring system (e.g., 104).

Figure 3C:
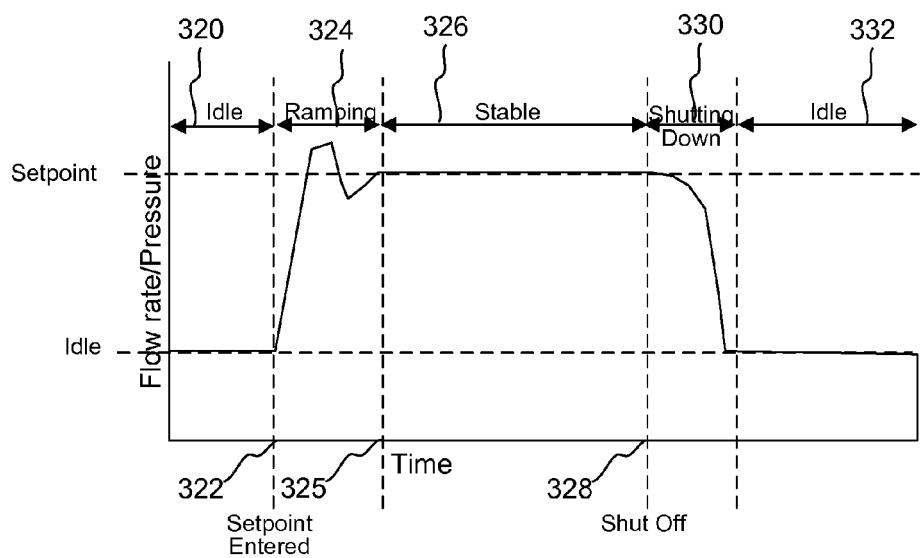
FIG. 3C is a graph of flow rate/pressure as a function of time that illustrates the various phases of the gas flowing in an MFC or UPC.

An MFC or UPC may be used to input gas into a chamber for a vapor deposition process. The gas may interact with a plasma or heat to thereby cause a film of material to form on a wafer or cause a film to be removed from a wafer. Input of a particular setpoint to an MFC or UPC causes the gas to transition between two different phases or stages if the MFC or UPC is functioning properly. FIG. 3C is a graph of flow rate/pressure as a function of time that illustrates the various phases of the gas flowing in an MFC or UPC. The Idle Stage 320 occurs when minimum gas is flowing or moving through the MFC or UPC so as to inhibit material deposition on the wafer. A setpoint is then input to the MFC or UPC at time 322 to cause the orifice of the MFC or UPC to widen, which causes the gas flow/pressure to ramp up in a Ramping Stage 324. Once the setpoint is substantially reached at time 325, the gas has reached a Stable Stage 326. For example, when the measured flow rate or pressure is within a predetermined amount from the input setpoint or when the flow rate has increased and then leveled off for a predetermined time, the Stable Stage is reached. At time 328, a shutdown command or setpoint is input to the MFC or UPC to cause the gas to ramp down (e.g., the orifice is narrowed) in a Shutting Down Stage 330 until an Idle Stage 322 is again reached.

Various aspects of an MFC or UPC may be monitored without requiring knowledge of the setpoint or recipe for the associated process system. That is, the monitoring does not analyze or use the recipe. In one example implementation, the effective orifice diameter may be monitored, correlated to failure probability values, and an alert generated when the effective orifice diameter correlates to a particular failure probability. In another example illustrated in FIG. 4, the time it takes for the MFC or UPC to ramp up or shut down is monitored. A long duration for a single occurrence of such stage or a trend towards increasing durations for such stage may indicate a failure or that a failure is imminent and, accordingly, an alarm may be sent or the discrepancy may be stored or reported.

Figure 4:
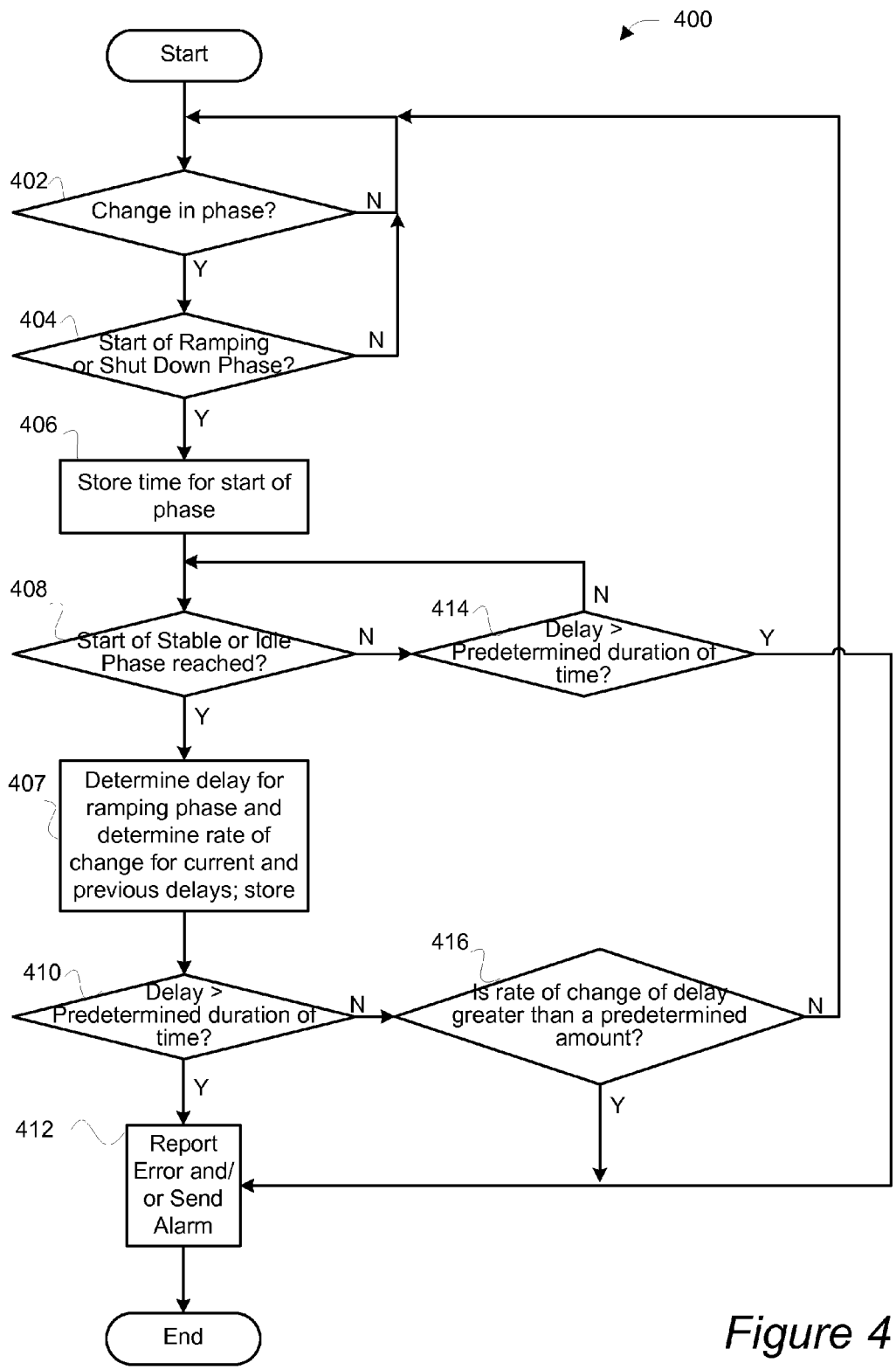
FIG. 4 is a flowchart illustrating a procedure for monitoring the time of one or more Ramping or Shutdown Stages in accordance with one embodiment of the present invention.

FIG. 4 is a flowchart illustrating a procedure 400 for monitoring the time of one or more Ramping or Shutdown Stages in accordance with one embodiment of the present invention. Initially, it may be determined whether a change in phase or stage has occurred in operation 402. In an event driven implementation, the following transitions may correspond to a phase change and be so specified to the monitoring system: transition from idle to ramping phase, (ii) transition from ramping to stable phase, (iii) transition from stable to shutting down phase, and (iv) transition from shutting down phase to idle phase. Each of these transition changes may result in such transition and its time of occurrence being specified to the monitoring system, for example, by a controller.

If no change has occurred, the procedure may continue to wait for a phase change. When a change occurs, it may then be determined whether such change corresponds to the start of either a ramping or shutting down phase in operation 404. For instance, these two transitions trigger a monitoring procedure in embodiments of the present invention. Of course, other transitions or aspects of each phase may also be monitored. For instance, the pressure or flow rate may be compared against the input setpoint during the stable phase.

In the illustrated example, if a ramping or shutting down phase has not started, the procedure may continue to wait for another change in operation 402. When a ramping or shut down phase has commenced, the time for the start of such phase is stored, for example, in data historian 106 in operation 406. It may then be determined whether the stable phase has been reached after the ramping phase has commenced or whether the idle phase has been reached after the shutting down phase has commenced in operation 408.

If the stable phase is not reached after commencement of the ramping phase or the idle phase is not reached after commencement of the shutting down phase, it may then be determined whether the delay has reached a predetermined duration of time in operation 414. This step may be performed to check whether the ramping or shutting down phase is taking an unacceptable amount of time. An "unacceptable amount of time" may be defined in any suitable manner and may correlate to a maximum time that has been experienced for reaching the stable or idle phase during past process cycles. If this predetermined delay limit has not been reached, the procedure continues to wait for the stable or idle phase in operation 408. Otherwise, if the limit has been reached, a report of the error may be generated and/or an alarm may be sent in operation 412.

When the delay is larger than a predetermined limit, this discrepancy between the ramping or shutting down delay and the predetermined limit may simply be reported or stored so that it can be reviewed later by a user. An alarm may also be sent and include any suitable information, such as the recent history of phase and corresponding time changes, identification of the component and process system, etc. An alarm may be generated in any suitable manner. By way of examples, an error message may be displayed on the graphical user interface of the process system and/or monitoring system and/or an email, instance message, telephone text or voice message, and/or page may be sent to one or more particular personnel.

If the stable phase is reached after commencement of the ramping phase or the idle phase is reached after commencement of the shutting down phase, a delay between the start of the ramping or shutting down phase and the commencement of either the stable or idle phase may be determined and a rate of change of the current and previously determined delays may also be determined in operation 407. The determined current delay and rate of change of the delays may also be stored in operation 407.

It may then be determined whether the delay for the ramping or shutting down phase is greater than a predetermined duration of time in operation 410. This limit may be set to correlate with time delays that have previously resulted in failure on the wafer or damage to the process system, product or a human. If the delay is longer than the predetermined duration of time, an error may be reported and/or an alarm sent in operation 412.

If the current delay is found not to be above a predetermined limit, it may also then be determined whether the rate of change in the delay is greater than a predetermined amount in operation 416. In other words, it is determined whether the delay of the ramping or shutting down phase is increasing over time by a significant amount. The significant amount can be any specified value that correlates with a high probability of a problem occurring. If the rate of change in delay is above a predetermined amount, an error may be reported or an alarm sent in operation 412. Otherwise, the procedure may continue to wait for another phase change in operation 402.

A significant delay or increase in the delay in the ramping up time for an MFC or UPC can indicate various problems. One problem may involve a fluxuation in the pressure in the gas input into the MFC or UPC. The orifice may become starved and not be receiving enough gas to produce a particular flow rate or pressure, even when the orifice is at a maximum opening. There may be problem upstream in the gas line, e.g., a clog, leak, or excess load sharing by other systems. Another problem may occur downstream from the MFC or UPC when excess gas is backing up into the orifice and causing too much back pressure to achieve a particular flow rate through the MFC or UPC.

In another monitoring example, the effective orifice diameter of the MFC or UPC may be checked while the gas is flowing normally to determine whether it is in a "normal" position. The "normal" position may be determined by examining long term correlations between effective orifice diameter and failure probability. If the effective orifice diameter is determined to correlate to a high failure probability, and an error may be reported or an alarm sent.

Figure 5A:
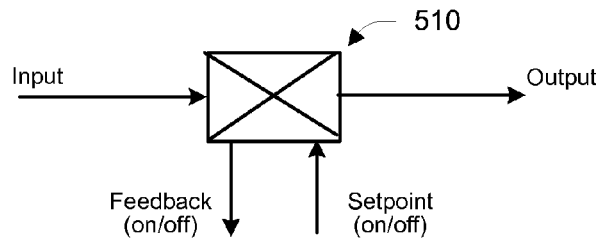
FIG. 5A is a diagrammatic representation of a valve.
Figure 5B:
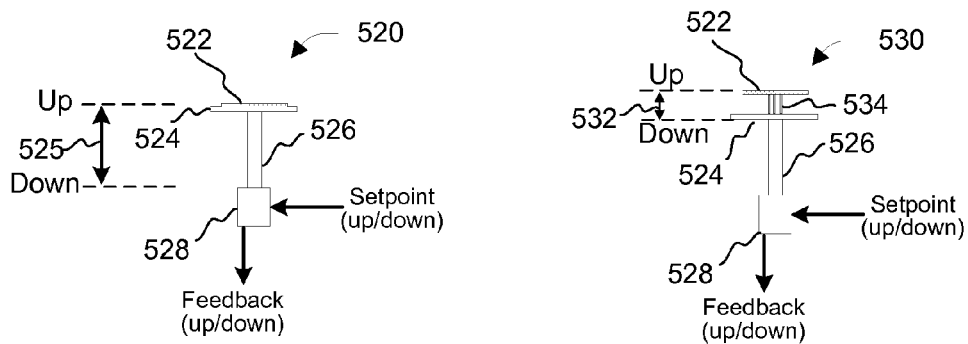
FIG. 5B is a diagrammatic representation of a pedestal and lift.

FIG. 5A is a diagrammatic representation of a valve 510. The valve receives input, which is output when the valve is open. The valve is controlled by a setpoint that specifies that the valve be closed or opened. The valve also outputs feedback to indicate the valve's state (e.g., open or closed). FIG. 5B is a diagrammatic representation of a pedestal 520 and lift 530. The lift also includes lift pins 534 that raise the wafer 524 to an up position that is above the platform 524 and to a down position that rests the wafer on the platform 524. Both the pedestal and lift include a platform 524 upon which the wafer resides, a shaft 526 upon which the platform is coupled, and a motor 528 for moving the platform or lift pins, along with the wafer 522, to an up and down position. The pedestal 520 is operable to move the platform 524 and wafer along direction 525 to an up or down position, while the lift 530 is operable to move the pins 534 and wafer along direction 532 to an up or down position.

Figure 5C:
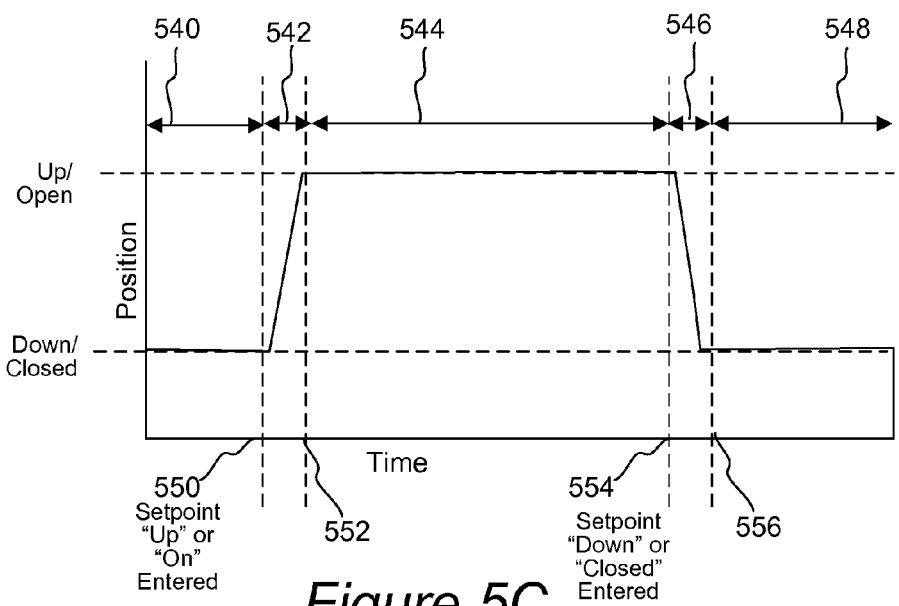
FIG. 5C a graph of position as a function of time that illustrates the various states of a valve, pedestal, or lift.

FIG. 5C a graph of position as a function of time that illustrates the various states of a valve, pedestal, or lift. The Down or Closed state 540 occurs when the pedestal or lift is in a down position or when the valve is closed. A setpoint is then input to the valve, pedestal, or lift at time 550, which causes (in most cases) the pedestal or lift or the valve to ramp up to an up or an open position in a Ramping Up State 542. That is, the Ramping Up State corresponds to the transition time between an Down/Closed State to an Up/Open State. Once the pedestal or lift is in an up position or the valve is open at time 552, the component has reached an UP or Open State 544. At time 554, a "Down" or "Close" command or setpoint is input to the pedestal/lift or valve, respectively, to cause the component to ramp down in a Ramping Down State 546 until a Down/Closed State 548 is reached at time 556. This graph is also representative of other types of binary state devices, such as doors.

Figure 6:
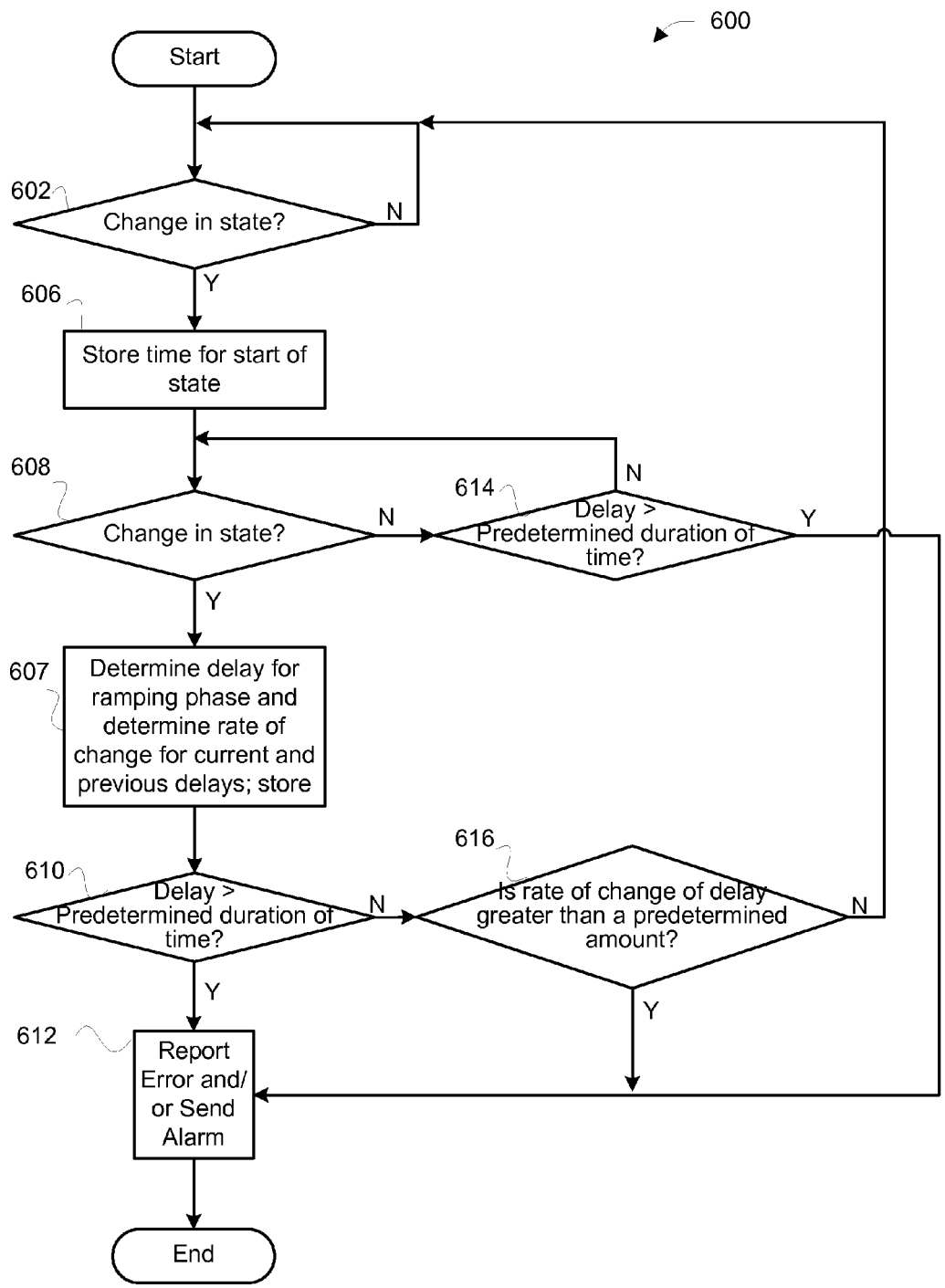
FIG. 6 is a flowchart illustrating a procedure for monitoring the ramping delay of a binary state component in accordance with one embodiment of the present invention.

In general, the transition delay between the two states of a binary type component can be monitored without requiring analysis of a recipe. FIG. 6 is a flowchart illustrating a procedure 600 for monitoring the ramping delay of a binary state component in accordance with one embodiment of the present invention. Initially, the procedure awaits a change in state in operation 602. A state change can include a change from an up or down state to a ramping state or a change from an open or closed state to a ramping state. The time for the start of this new (e.g., ramping) state is then stored in operation 606.

After a state change occurs (e.g., ramping has commenced), it may then be determined whether another change in state has occurred in operation 608. That is, it is determined whether the ramping state has ended and the component has changed between a ramping state to an up/down state or between ramping state to an open/closed state. If another state change has occurred, a delay between each state may be determined and a rate of change of the current and previously determined delays may also be determined in operation 607. It may then be determined whether the current delay is longer than a predetermined duration of time in operation 610. If the delay is longer than the predetermined duration of time, an error may be reported and/or an alarm sent in operation 612.

If the current delay is found not to be above a predetermined limit, it may also then be determined whether the rate of change in the delay is greater than a predetermined amount in operation 616. In other words, it is determined whether the delay of the ramping state is increasing over time by a significant amount. The significant amount can be any specified value that correlates with a high probability of a problem occurring. If the rate of change in delay is above a predetermined amount, an error may be reported and/or an alarm sent in operation 612. Otherwise, the procedure may continue to wait for another state change in operation 602.

If another state change has not occurred, it may then be determined whether the current delay for reaching another state has surpassed a predetermined duration of time in operation 614. For instance, it may be taking a significant time for the valve to open or the pedestal/lift to move to an up position. If this predetermined delay limit has not been reached, the procedure continues to wait for the next state change in operation 608. Otherwise, if the limit has been reached, a report of the error may be generated and/or an alarm may be sent in operation 612.

A significant delay in opening/closing a valve or door or moving a pedestal or lift may indicate wear and tear on the component. Worn mechanical parts may result in particles being introduced onto the semiconductor device. Particle contamination of the device can result in device failure. A significant delay may also indicate that pressure is being built up behind a valve or door that is blocked and may cause such high pressure to break the current or another valve in the system, for example.

Figure 7A:
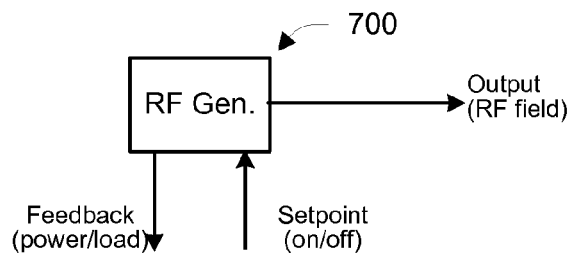
FIG. 7A is a diagrammatic representation of an RF generator.

Another type of component is an RF generator which is operable to create a plasma of ionized gas from an RF field. FIG. 7A is a diagrammatic representation of an RF generator 700. A setpoint is used to turn on the RF generator to thereby create an RF field that is strong enough to then break apart atoms in a gas that is present near the generator and create an ionized plasma. The states of the RF generator can include an idle state, a ramping up state, a stable state, and a shutting down state. These states are similar to the states of an MFC or UPC, but have sharper ramping down and shutting down states. These states may be output from the RF generator or determined by a controller coupled to the RF generator which is operable to send the setpoint to the RF generator and receive feedback from the RF generator. The feedback may include measurements of forward power, reflected power, and load. The load may be derived from the other two measurements. These measurements and the states of the RF generator may be monitored, for example, by a monitoring system.

Embodiments of the present invention include techniques for monitoring the delay of the ramping up and shutting down states for an RF generator, or the like. If the ramping up state takes an inordinate amount of time, there could be a problem with the generator, e.g., not enough gas, bad ground plane, power is coupled to the wrong input, mismatched frequency inputs, etc. A long delay could also mean that the environment into which the plasma is being built is not ideal.

Figure 7B:
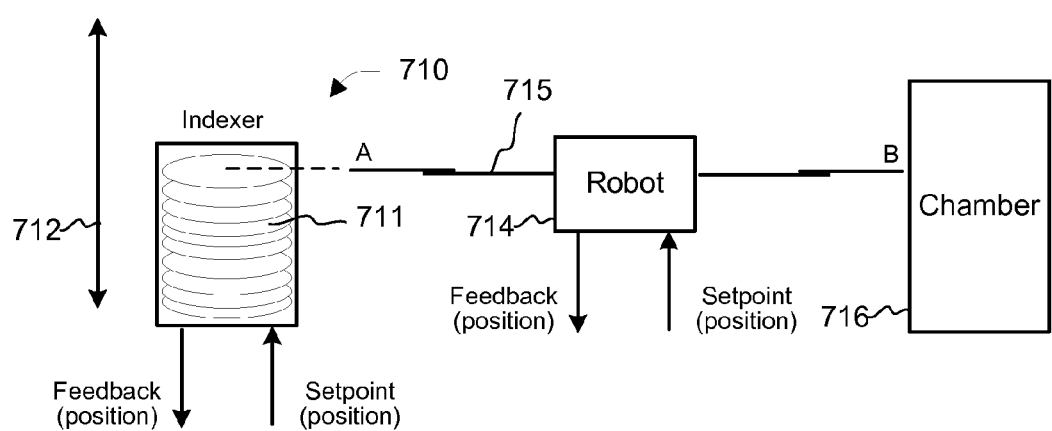
FIG. 7B contain block diagrams of an indexer and robot.

Other types of components include an indexer and robot, which are illustrated in FIG. 7B. As shown, an indexer 710 is operable to move a cassette of wafers 711 up and down along axis 712. The wafers are stacked vertically in the cassette so that vertical movement results in different wafers being positioned at a particular position. As shown, the cassette of wafers 711 is moved along direction 712 so as to position a particular one of the wafers (or wafer slot) at position A. For instance, the wafers may include wafers or slots 1 through 25. The indexer may position wafer 1 at position A, and then wafer 2 at position A, etc. As shown, position A is reachable by an arm 715 of robot 714, which is configured to move the wafer at position A to another position, e.g., position B.

In sum, the indexer moves a particular wafer slot to a position that is accessible by a robot arm. Accordingly, feedback from an indexer may be in the form of position value. This position value may correspond to particular wafer slots. The transition time between slots may be monitored to ensure that the indexer is not taking more than a predetermined delay in moving to between particular wafer slots. A long delay may indicate that the indexer has experienced wear and tear or there is a problem with an electrical component of the indexer. As with any component, wear and tear on a mechanical component can produce particles and destroy the wafer product.

Each arm position of each robot may also be monitored for delays between particular positions. Each process system may include one or more robots that each have one or more arms for moving wafers between loading cassettes and chambers of the process system. Each arm may be operable to rotationally or linearly move between each position. As shown, arm 715 of robot 714 moves a wafer between position A of cassette 711 and position B of chamber 716. The transition time between a set of positions may be monitored for significant delays that may indicate a problem with the robot or process system environment.

In any of the above described monitoring examples, if an alert is sent for any type of component of a particular process tool, downtime of the process tool may then be scheduled. In contrast to scheduled downtime, unscheduled downtime is associated with significant expenditures of time and money. In a scheduled shutdown, wafers can be re-routed to other tools, rather than scrapped. The monitoring techniques of the present invention allow detection of actual failures, as well as prediction of potential failures. When a failure has occurred or is predicted to likely occur, the process system may be examined to determine a root cause of the failure or potential failure. For instance, when a door or valve is taking longer to open, the door or valve may be examined for wear and tear.

The characteristics, such as ramping delay, of subsets of components of a process system may also be correlated together to predict failures that occur when a particular subset of conditions are present. For instance, if a particular set of characteristic values occur together, this behavior can be correlated with a particular failure outcome. Steps can then be taken to alleviate the problem.

The monitoring techniques of the present invention may be implemented in any suitable combination of software and/or hardware system, such as a metrology or inspection system's processor. Regardless of the system's configuration, it may employ one or more memories or memory modules configured to store data, program instructions for the general-purpose metrology operations and/or the inventive techniques described herein. The program instructions may control the operation of an operating system and/or one or more applications, for example. The memory or memories may also be configured to store setpoints, feedback information, specification information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Embodiments of the present invention employ various processes involving data stored in or transferred through one or more computer systems. Embodiments of the present invention also relate to the apparatus for performing these operations. These apparatus and processes may be employed to monitor characteristics of one or more components, retrieve stored specifications from databases or other repositories, and compare such monitored characteristics to the specifications. The monitoring apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Figure 8:
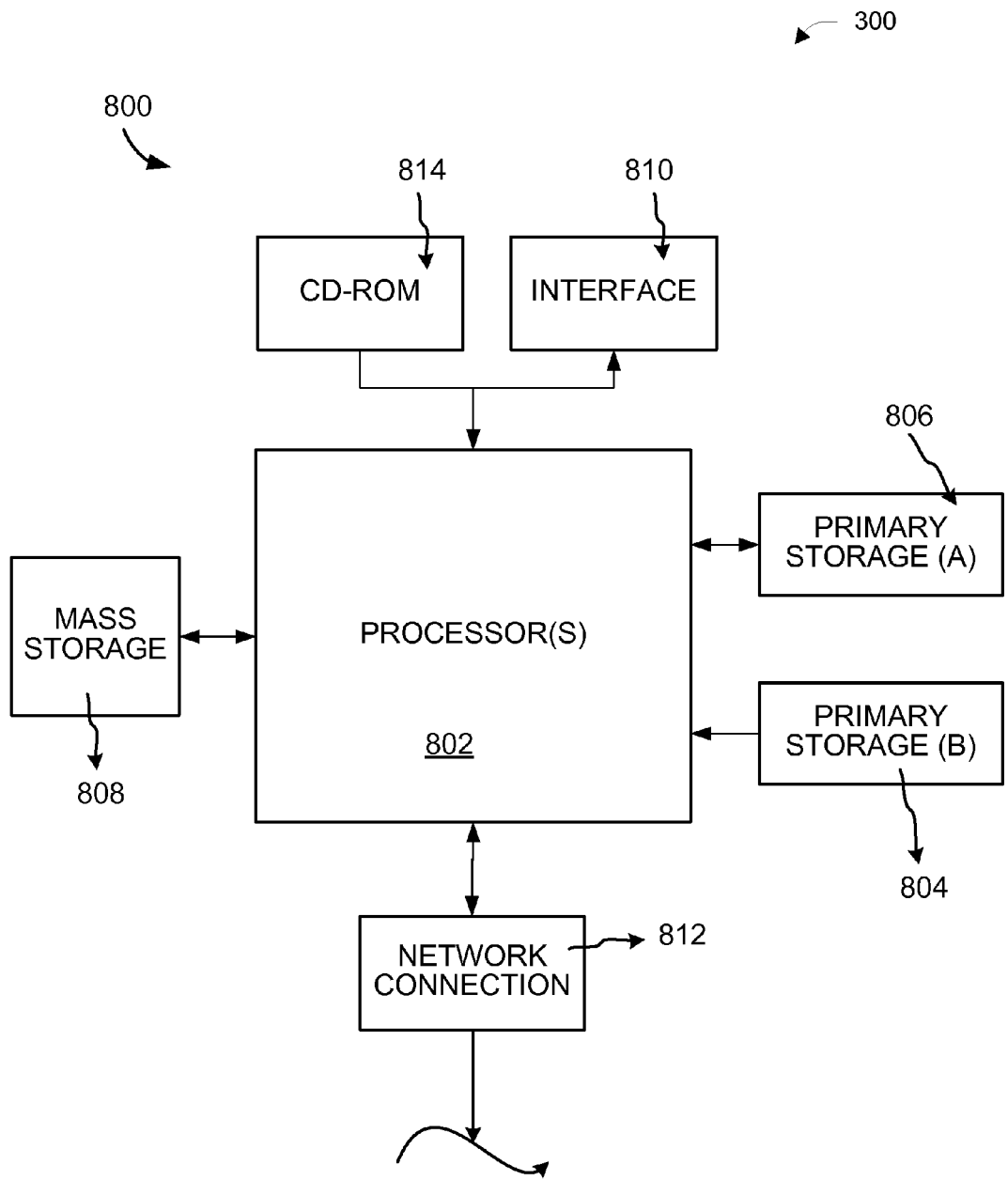
FIG. 8 illustrates a typical computer system that, when appropriately configured or designed, can serve as a monitoring system of this invention.

FIG. 8 illustrates a typical computer system that, when appropriately configured or designed, can serve as a monitoring system of this invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). CPU 802 may be of various types including microcontrollers and microprocessors such as programmable devices (e.g., CPLDs and FPGAs) and unprogrammable devices such as gate array ASICs or general purpose microprocessors. As is well known in the art, primary storage 804 acts to transfer data and instructions uni-directionally to the CPU and primary storage 806 is used typically to transfer data and instructions in a bi-directional manner. Both of these primary storage devices may include any suitable computer-readable media such as those described above. A mass storage device 808 is also coupled bi-directionally to CPU 802 and provides additional data storage capacity and may include any of the computer-readable media described above. Mass storage device 808 may be used to store programs, data and the like and is typically a secondary storage medium such as a hard disk. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 is also coupled to an interface 810 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to an external device such as a database or a computer or telecommunications network using an external connection as shown generally at 812. With such a connection, it is contemplated that the CPU might receive information from the network, or might output information to the network in the course of performing the method steps described herein.

Typically, the computer system 800 is coupled with various one or more controllers and measurements devices of one or more process systems. For example, the computer system of FIG. 8 may correspond to the monitoring system 104 depicted in FIGS. 1 and 2. Data from each component 204 of each process system is provided for analysis by system 800. With this data, the apparatus 800 can issue various reports and alarms when the data is determined to be out of specification, e.g., indicates or predicts a potential problem or failure.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of monitoring a process system for performing a fabrication operation on a semiconductor wafer, the method comprising:

enabling output of a feedback from the process system and receiving the feedback, the feedback specifying a characteristic of a component of the process system, wherein the characteristic is in response to input data sent to the component;

determining whether there is an actual or imminent problem with the process system based on the feedback, wherein such determination is accomplished without analysis of the input data sent to such component; and reporting the actual or imminent problem or sending an alert regarding the actual or imminent problem when it is determined that there is an actual or imminent problem, while physically disabling output of the input data from the process system.

2. A method as recited in claim 1, wherein the component is a mass flow controller (MFC) or a unit pressure controller (UPC) of the process system, the feedback specifies an effective orifice diameter of the MFC or UPC, and it is determined that there is an actual or imminent problem when the effective orifice diameter correlates with probability of failure that is higher than a predetermined amount.

3. A method as recited in claim 1, wherein determining whether there is an actual or imminent problem with the process system is accomplished by correlating the feedback with feedback from other measurement devices to thereby predict failure are likely to occur under a set of conditions of the current and other measurement devices.

4. A method as recited in claim 1, wherein the feedback specifies an RF power level or DC power level output and the determination is based on such output without being based on a RF or DC power level input to the component.

5. A method as recited in claim 1, wherein the feedback specifies a length of time of processing the wafer.

6. A method as recited in claim 1, wherein the feedback specifies a flow level output and the determination is based on such output without being based on a flow level setpoint input to the component.

7. A method as recited in claim 1, wherein the feedback specifies a rotational speed.

8. A method as recited in claim 1, wherein the feedback specifies a voltage output.

9. An apparatus for monitoring a process system for performing a fabrication operation on a semiconductor wafer, comprising:

one or more processors;

one or more memory, wherein at least one of the processors and memory are adapted for:

enabling output of a feedback from the process system and receiving the feedback, the feedback specifying a characteristic of a component of the process system, wherein the characteristic is in response to input data sent to the component;

determining whether there is an actual or imminent problem with the process system based on the feedback, wherein such determination is accomplished without analysis of the input data sent to such component; and reporting the actual or imminent problem or sending an alert regarding the actual or imminent problem when it is determined that there is an actual or imminent problem, while physically disabling output of the input data from the process system.

10. An apparatus as recited in claim 9, wherein the component is a mass flow controller (MFC) or a unit pressure controller (UPC) of the process system, the feedback specifies an effective orifice diameter of the MFC or UPC, and it is determined that there is an actual or imminent problem when the effective orifice diameter correlates with probability of failure that is higher than a predetermined amount.

11. An apparatus as recited in claim 9, wherein determining whether there is an actual or imminent problem with the process system is accomplished by correlating the feedback with feedback from other measurement devices to thereby predict failure are likely to occur under a set of conditions of the current and other measurement devices.

12. An apparatus as recited in claim 9, wherein the feedback specifies an RF power level or DC power level output and the determination is based on such output without being based on a RF or DC power level input to the component.

13. An apparatus as recited in claim 9, wherein the feedback specifies a length of time of processing the wafer.

14. An apparatus as recited in claim 9, wherein the feedback specifies a flow level output and the determination is based on such output without being based on a flow level setpoint input to the component.

15. An apparatus as recited in claim 9, wherein the feedback specifies a rotational speed.

16. An apparatus as recited in claim 9, wherein the feedback specifies a voltage output.

17. A computer program product for monitoring a process system for performing a fabrication operation on a semiconductor wafer, the computer program product comprising:

at least one non-transitory computer readable medium;

computer program instructions stored within the at least one computer readable product configured to cause a processing device to:

enabling output of a feedback from the process system and receiving the feedback, the feedback specifying a characteristic of a component of the process system, wherein the characteristic is in response to input data sent to the component;

determining whether there is an actual or imminent problem with the process system based on the feedback, wherein such determination is accomplished without analysis of the input data sent to such component; and reporting the actual or imminent problem or sending an alert regarding the actual or imminent problem when it is determined that there is an actual or imminent problem, while physically disabling output of the input data from the process system.

18. A computer program product as recited in claim 17, wherein the component is a mass flow controller (MFC) or a unit pressure controller (UPC) of the process system, the feedback specifies an effective orifice diameter of the MFC or UPC, and it is determined that there is an actual or imminent problem when the effective orifice diameter correlates with probability of failure that is higher than a predetermined amount.

19. A computer program product as recited in claim 17, wherein the feedback specifies an RF power level or DC power level output and the determination is based on such output without being based on a RF or DC power level input to the component.

20. A computer program product as recited in claim 17, wherein the feedback specifies a flow level output and the determination is based on such output without being based on a flow level setpoint input to the component.

21. The method of claim 1, wherein the input data includes proprietary input data, and wherein disabling output of the input data includes disabling output of the proprietary input data.

22. The apparatus of claim 9, wherein the input data includes proprietary input data, and wherein disabling output of the input data includes disabling output of the proprietary input data.

23. The computer program product of claim 17, wherein the input data includes proprietary input data, and wherein disabling output of the input data includes disabling output of the proprietary input data.

* * * * *